US009516256B2

(12) United States Patent
White (10) Patent No.: US 9,516,256 B2
(45) Date of Patent: Dec. 6, 2016

(54) APPARATUS AND METHOD FOR PROCESSING A RADIO FREQUENCY SIGNAL

(75) Inventor: David Glen White, Indianapolis, IN (US)

(73) Assignee: Thomson Licensing, Issy de Moulineaux (FR)

( * ) Notice: Subject to any disclaimer, the term of this patent is extended or adjusted under 35 U.S.C. 154(b) by 425 days.

(21) Appl. No.: 14/002,838

(22) PCT Filed: Feb. 29, 2012

(86) PCT No.: PCT/US2012/027055
§ 371 (c)(1),
(2), (4) Date: Sep. 3, 2013

(87) PCT Pub. No.: WO2012/118874
PCT Pub. Date: Sep. 7, 2012

(65) Prior Publication Data
US 2015/0195477 A1    Jul. 9, 2015

Related U.S. Application Data

(60) Provisional application No. 61/448,720, filed on Mar. 3, 2011.

(51) Int. Cl.
| | |
|---|---|
| *H04N 5/50* | (2006.01) |
| *H04N 5/20* | (2006.01) |
| *H04N 5/46* | (2006.01) |
| *H04N 7/10* | (2006.01) |
| *H04N 21/426* | (2011.01) |

(52) U.S. Cl.
CPC .............. *H04N 5/50* (2013.01); *H04N 5/20* (2013.01); *H04N 5/46* (2013.01); *H04N 7/104* (2013.01); *H04N 21/4263* (2013.01)

(58) Field of Classification Search
USPC ....... 348/731, 732, 730, 726, 725, 711, 710, 348/707, 706, 564, 462, 432.1, 429.1, 348/231.4; 330/61 R, 73, 123, 124 R, 142, 330/177, 295, 330/297, 302, 307, 10, 330/17.1, 136, 174, 254, 330/279; 333/100, 118, 124, 172, 205, 207, 333/209, 221, 223; 439/88, 126, 620.04, 439/620.09, 620.13, 620.24; 327/64, 155, 327/202, 327/313
See application file for complete search history.

(56) References Cited

U.S. PATENT DOCUMENTS

| | | | | |
|---|---|---|---|---|
| 4,513,263 | A | * | 4/1985 | Minnis ................ H01P 1/20381 333/202 |
| 4,566,331 | A | * | 1/1986 | Schroeder ....................... 73/632 |
| 5,021,755 | A |   | 6/1991 | Gustafson |
| 6,181,382 | B1 | * | 1/2001 | Kieu et al. .................... 348/459 |

(Continued)

*Primary Examiner* — Jefferey Harold
*Assistant Examiner* — Mustafizur Rahman
(74) *Attorney, Agent, or Firm* — Brian J. Dorini; Michael A. Pugel (57) ABSTRACT

Many advanced signal receiving devices include more than one tuner. An apparatus is described that includes a first circuit operating as a first portion of a signal attenuator, a second circuit operating as a second portion of the signal attenuator and outputting a first differential output signal, and a third circuit also operating as the second portion of the signal attenuator and outputting a second differential output signal. A method is described including receiving a signal, splitting the received signal to produce a first output signal and a second output signal, the splitting being performed using a differential signal format and further being performed using only at least one of a resistor, capacitor, and inductor, and outputting the first output signal in a differential signal format and the second output signal in a differential signal format.

25 Claims, 5 Drawing Sheets

(56) References Cited

U.S. PATENT DOCUMENTS

| | | | |
|---|---|---|---|
| 6,297,696 B1* | 10/2001 | Abdollahian et al. | 330/124 R |
| 6,545,564 B1 | 4/2003 | Coppola | |
| 6,750,652 B2 | 6/2004 | Weyers | |
| 7,102,460 B2* | 9/2006 | Schmidhammer | H03H 9/0038 333/133 |
| 7,194,247 B2* | 3/2007 | Tikka | H03H 9/70 333/13 |
| 7,245,883 B2* | 7/2007 | Nakatani | H04B 1/525 370/282 |
| 7,277,403 B2* | 10/2007 | Frank | H01P 1/213 370/282 |
| 7,830,912 B2* | 11/2010 | Lin | H04B 1/006 370/320 |
| 8,508,296 B1* | 8/2013 | Mustafa et al. | 330/124 R |
| 2002/0098863 A1* | 7/2002 | Ferianz | 455/552 |
| 2002/0145449 A1* | 10/2002 | Rivoir et al. | 326/93 |
| 2003/0060170 A1* | 3/2003 | Tikka | H03H 9/70 455/73 |
| 2003/0094985 A1* | 5/2003 | Heo | H03K 3/356139 327/202 |
| 2003/0111705 A1* | 6/2003 | Seo | 257/491 |
| 2004/0212876 A1* | 10/2004 | Bhowmik et al. | 359/349 |
| 2005/0007174 A1* | 1/2005 | Kobayashi | H03K 19/01707 327/313 |
| 2005/0012547 A1* | 1/2005 | Kwon | H03F 1/0205 330/124 R |
| 2005/0206475 A1* | 9/2005 | Strull et al. | 333/124 |
| 2005/0231243 A1* | 10/2005 | Woods | H03K 5/1565 327/122 |
| 2005/0242850 A1* | 11/2005 | Kawasaki | G06F 13/1689 327/155 |
| 2005/0245201 A1* | 11/2005 | Ella | H04B 1/005 455/78 |
| 2006/0253874 A1* | 11/2006 | Stark | G06F 3/038 725/62 |
| 2006/0276158 A1* | 12/2006 | Okabe | H04B 1/38 455/333 |
| 2006/0290444 A1* | 12/2006 | Chen | 333/118 |
| 2007/0063790 A1* | 3/2007 | Strull | H03H 7/482 333/109 |
| 2007/0181554 A1* | 8/2007 | Nakano | G01F 1/684 219/216 |
| 2008/0174343 A1* | 7/2008 | Cha | H04L 25/0292 327/64 |
| 2008/0218294 A1* | 9/2008 | Gorostegui | H01P 5/184 333/128 |
| 2009/0079428 A1* | 3/2009 | Nistler et al. | 324/311 |
| 2009/0134928 A1* | 5/2009 | Yamakawa | H03H 11/245 327/308 |
| 2009/0153245 A1* | 6/2009 | Lee | H03F 1/3211 330/254 |
| 2009/0254955 A1 | 10/2009 | Petruzzelli | |
| 2009/0273401 A1 | 11/2009 | Fanous et al. | |
| 2009/0278599 A1* | 11/2009 | Pengelly | 330/124 R |
| 2010/0083303 A1* | 4/2010 | Redei | H04N 7/17318 725/32 |
| 2010/0259446 A1* | 10/2010 | Corman et al. | 342/373 |
| 2011/0135316 A1* | 6/2011 | Fankhauser | G02B 6/4453 398/164 |
| 2012/0056545 A1* | 3/2012 | Radermacher | H05B 33/0818 315/152 |

\* cited by examiner

APPARATUS AND METHOD FOR PROCESSING A RADIO FREQUENCY SIGNAL

REFERENCE TO RELATED PROVISIONAL APPLICATION

This application claims the benefit, under 35 U.S.C. §365 of International Application PCT/US2012/027055 filed Feb. 29, 2012 which was published in accordance with PCT Article 21(2) on Sep. 7, 2012 in English and which claims the benefit of U.S. provisional patent application No. 61/448,720, filed Mar. 3, 2011.

TECHNICAL FIELD OF THE INVENTION

The present disclosure generally relates to systems that process radio frequency signals and more particularly to an apparatus and method for providing a signal in a differential signaling format to two receiving circuits.

BACKGROUND OF THE INVENTION

This section is intended to introduce the reader to various aspects of art, which may be related to the present embodiments that are described below. This discussion is believed to be helpful in providing the reader with background information to facilitate a better understanding of the various aspects of the present invention. Accordingly, it should be understood that these statements are to be read in this light and not as admissions of prior art.

Many advanced signal receiving devices, such as set top boxes and gateways, include more than one tuner. The use of multiple tuners for tuning and receiving multiple channels simultaneously in a signal receiving device allows for a number of new features that enhance the user's home video experience. These features include, but are not limited, to multi-room playback, multi-program simultaneous recording, and remote or networked viewing options. The requirements for expansion of features associated with tuning and receiving multiple channels, such as the above, often include an ever increasing number of tuners.

However, the use of multiple tuners creates problems associated with signal routing and processing, particularly in the Radio Frequency (RF) signal processing. These problems are further complicated by the use of System on Chip (SoC) integrated circuits (ICs) that incorporate many of the necessary features used as part of a signal receiving device. Expansion of the functionality of these SoCs may prove problematic particularly as the number of tuners in the signal receiving device increases. In one example, a design having a total of six tuners may further include one or more of the RF signal interfaces requiring a differential signal input to the SoC as well as differential outputs from the SoC to drive external tuner ICs with dual integrated tuners, also requiring differential signal inputs.

The design and use of a single-ended unbalanced (i.e., non-differential) RF signal splitter is common in signal receiving systems. However, the additional requirements for operation of signals using differential input and output signaling formats present design challenges. Operation of differential signals that operate over a wide frequency range, such as a frequency range of 950 Megahertz (MHz) to 2,150 MHz, further complicates the design. Some approaches have focused on developing a differential signal splitter based primarily on the use of electromagnetic coupling mechanisms, such as transformers. However, differential signal splitters using electromagnetic coupling mechanisms are often complex, expensive, and may not be easily manufactured. Therefore, there is a need for a simple and cost effective apparatus for interfacing an RF input signal to more than one receiving circuit in a balanced differential signaling format.

SUMMARY

According to an aspect of the present disclosure, an apparatus for dividing signal power is described. The apparatus includes a first circuit coupled to an input, the first circuit operating as a first portion of a signal attenuator for an input signal, a second circuit coupled to the output of the first circuit, the second circuit operating as a second portion of the signal attenuator for the input signal and outputting a first differential output signal, and a third circuit coupled to the output of the first circuit, the third circuit also operating as the second portion of the signal attenuator for the input signal and outputting a second differential output signal.

According to another aspect of the present disclosure, a method processing a signal is described. The method includes receiving a signal, splitting the received signal to produce a first output signal and a second output signal, the step of splitting being performed using a differential signal format, the step of splitting further being performed using only at least one of a resistor, capacitor, and inductor, and outputting the first output signal in a differential signal format to a first circuit and the second output signal in a differential signal format to a second circuit.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

It should be understood that the drawing(s) are for purposes of illustrating the concepts of the disclosure and does not necessarily represent the only possible configuration(s) for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The following describes embodiments relating to broadcast signals, and more particularly to broadcast signals as defined for use in a satellite signal transmission system and a home networking system. The embodiments described may be used in a settop box, gateway device, television, or similar signal receiving device. Examples of similar receiving devices include, but are not limited to, cellular phones, intelligent phones, tablets, personal digital assistants, and laptop computers. Other systems utilized to receive other types of signals may include similar structures and processes. Those of ordinary skill in the art will appreciate that the embodiments of the circuits and processes described herein are merely one set of potential embodiments. It is important to note that signals compliant with various broadcast and wireless standards, in general, may be transmitted in a manner other than over a satellite network, including transmission over the air, over co-axial or optical cable, through a wireless network, or over telephone lines. As such, in alternate embodiments, the components of the system may be rearranged or omitted, or additional components may be added. For example, with minor modifications, the system described may be configured for use with terrestrial or cable broadcast services, wi-fi video and audio services, or phone data services, including services used elsewhere in the world.

The disclosed embodiments relate to an apparatus and method for splitting an RF signal and providing the signal to a plurality of tuners and signal processing elements in parallel in a receiver. The apparatus and method address issues related to interfacing balanced differential signals between the signal processing elements. One embodiment describes the combined use of conductive and resistive elements to form an RF signal splitting, or signal dividing, component that receives a balanced differential input signal and provides two balanced differential output signals. An alternate embodiment describes a configuration utilizing resistive components to form an RF signal splitting component. The embodiments provide a low cost, space efficient, easily manufactured design. The embodiments also reduce or eliminate the use of electromagnetic elements, such as transformers, that are often used for signal splitting and conversion between unbalanced single-ended signal format signals and balanced differential signal format signals. The embodiments may further provide specified signal level attenuation and isolation of the output signals for proper operation of and/or interfacing to the tuners or signal processing components.

Figure 1:
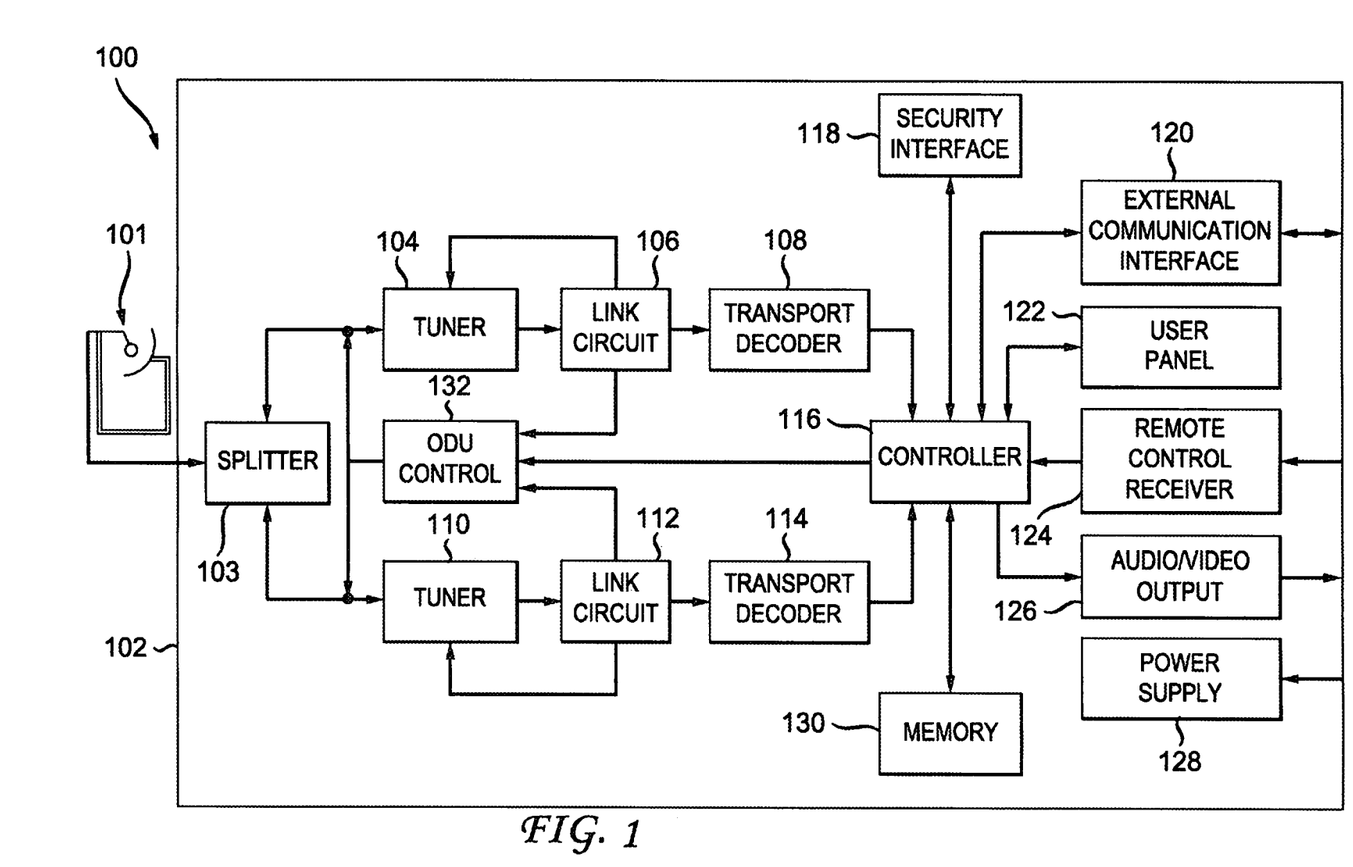
FIG. 1 is a block diagram of an exemplary device for receiving and processing signals in accordance with the present disclosure.

Turning now to the drawings and referring initially to FIG. 1, an exemplary embodiment of a signal receiving device 100 using aspects of the present invention is shown. Signal receiving device 100 primarily receives signals from one or more satellites. The signals are provided by a service provider and represent broadcast audio and video programs and content. Signal receiving device 100 is described as including components that reside both inside and outside a user's premises. It is important to note that one or more components in signal receiving device 100 may be moved from inside to outside the premises. Further, one or more components may be integrated with a display device, such as a television or display monitor (not shown). In either case, several components and interconnections necessary for complete operation of signal receiving device 100 are not shown in the interest of conciseness, as the components not shown are well known to those skilled in the art.

An outdoor unit (ODU) 101 receives signals from the satellite through an over the air near earth orbit communications link. ODU 101 is connected to set top box 102. Within set top box 102, the input is connected to splitter 103. Splitter 103 connects to two signal processing paths. A first path includes tuner 104, link circuit 106, and transport decoder 108 connected together serially. A second path includes tuner 110, link circuit 112, and transport decoder 114 connected together serially. The outputs of transport decoder 108 and transport decoder 114 each connect to controller 116. Controller 116 connects to security interface 118, external communication interface 120, user panel 122, remote control receiver 124, audio/video output 126, power supply 128, memory 130, and ODU control 132. External communication interface 120, remote control receiver 124, audio/video output 126, and power supply 128 provide external interfaces for the set top box 102. ODU control 132 also connects to the splitter 103.

Satellite signal streams, each containing a plurality of channels, are received by ODU 101. ODU 101 includes a dish for capturing and focusing the propagated radio wave from the atmosphere onto one or more antennas contained within a structure known as a low noise block converter (LNB). ODU 101 may be configured to receive the signal streams from satellite transponders located on one or more satellites. In a preferred embodiment, two sets of sixteen channels are received by ODU 101, and converted, using one or more LNBs to a frequency range of 950 MHz to 2,150 MHz, referred to as L-band.

ODU 101 provides a converted signal stream to the set top box 102 through RF co-axial cable. The converted signal stream is provided to splitter 103. Splitter 103 splits, or divides, the incoming converted signal stream into two separate signal streams. Splitter 103 operates on the converted signal streams at radio frequencies and must provide a splitting of the signal power that is present at the input of splitter 103. Splitter 103 also maintains proper input and output operating impedances across the entire range of operating frequencies. In one embodiment, splitter 103 splits the converted signal stream into two signal streams having between three decibels (dB) and five dB of signal insertion loss and having an operating impedance of 75 ohms at the input and both outputs.

Each of the separate split signal streams from splitter 103 is processed in a separate signal processing path. The upper signal path contains a tuner 104, a link circuit 106, and a transport decoder 108 with the signal path connected in a serial fashion. The lower path also contains a tuner 110, a link circuit 112, and a transport decoder 114 with the signal path also connected in a serial fashion. Each processing path may perform essentially identical signal processing on one of the split signal streams. Therefore only the upper signal processing path will be further described here.

The upper split signal stream from splitter 103 is provided to tuner 104. Tuner 104 processes' the split signal stream by selecting or tuning one of the channels in the split signal stream to produce one or more baseband signals. Tuner 104 contains circuits (e.g., amplifiers, filters, mixers, and oscillators) for amplifying, filtering and frequency converting the split signal stream. Tuner 104 typically is controlled or adjusted by link circuit 106. Alternately, tuner 104 may be controlled by another controller, such as controller 116, which will be described later. The control commands include commands for changing the frequency of an oscillator used with a mixer in tuner 104 to perform the frequency conversion.

Typically the baseband signals at the output of tuner 104 may collectively be referred to as the desired received signal and represent one satellite channel selected out of a group of channels that were received as the input signal stream. Although the signal is described as a baseband signal, this signal may actually be positioned at a frequency that is only near to baseband.

The one or more baseband signals from tuner 104 are provided to link circuit 106. Link circuit 106 typically contains the processing circuits needed to convert the one or more baseband signals into a digital signal for demodulation by the remaining circuitry of link circuit 106. In one embodiment the digital signal may represent a digital version of the one or more baseband signals. In another embodiment the digital signal may represent the vector form of the one or more baseband signals. Link circuit 106 also demodulates and performs error correction on the digital signal to produce a transport signal. The transport signal may represent a data stream for one program, often referred to as a single program transport streams (SPTS), or it may represent multiple program streams multiplexed together, referred to as a multiple program transport stream (MPTS).

The transport signal is provided to transport decoder 108. Transport decoder 108 typically separates the transport signal, which is provided as either a SPTS or MPTS, into individual program streams and control signals. Transport decoder 108 also decodes the program streams, and creates audio and video signals from these decoded program streams. In one embodiment, transport decoder 108 is directed by user inputs or through a controller such as controller 116 to decode only the one program stream that has been selected by a user and create only one audio and video signal corresponding to this one decoded program stream. In another embodiment, transport decoder 108 may be directed to decode all of the available program streams and then create one more audio and video signals depending on user request.

The audio and video signals, along with any necessary control signals, from both transport decoder 108 and transport decoder 114 are provided to controller 116. Controller 116 manages the routing and interfacing of the audio, video, and control signals and, further, controls various functions within set top box 102. For example, the audio and video signals from transport decoder 108 may be routed through controller 116 to an audio/video (A/V) output 126. A/V output 126 supplies the audio and video signals from set top box 102 for use by external devices (e.g., televisions, display monitors, and computers). Also, the audio and video signals from transport decoder 114 may be routed through controller 116 to memory block 130 for recording and storage. Memory block 130 may contain several forms of memory including one or more large capacity integrated electronic memories, such as static random access memory (SRAM), dynamic RAM (DRAM), or hard storage media, such as a hard disk drive or an interchangeable optical disk storage system (e.g., compact disk drive or digital video disk drive). Memory block 130 may include a memory section for storage of instructions and data used by controller 116 as well as a memory section for audio and video signal storage. Controller 116 may also allow storage of signals in memory block 130 in an alternate form (e.g., an MPTS or SPTS from transport decoder 108 or transport decoder 114).

Controller 116 is also connected to an external communications interface 120. External communication interface 120 provides signals for establishing billing and use of the service provider content. External communications interface 120 may include a phone modem for providing phone connection to a service provider. Controller 116 also connects to a security interface 118 for communicating signals that manage and authorize use of the audio/video signals and for preventing unauthorized use. Security interface 118 may include a removable security device, such as a smart card. User control is accomplished through user panel 122, for providing a direct input of user commands to control the set top box and remote control receiver 124, for receiving commands from ah external remote control device. Although not shown, controller 116 may also connect to the tuners 104, 110, link circuits 106, 112, and transport decoders 108, 114 to provide initialization and set-up information in addition to passing control information between the blocks. Finally, power supply 128 typically connects to all of the blocks in set top box 102 and supplies the power to those blocks as well as providing power to any of the elements needing power externally, such as the ODU 101.

Controller 116 also controls ODU control 132. ODU control 132 provides the signaling and power supply signals back to the ODU 101 by providing these signals onto the co-axial cable(s) running between ODU 101 and set top box 102. In one embodiment, the ODU control 132 receives input control signals from controller 116 and provides different DC voltage levels to specific portions of the ODU 101 to provide a certain signal stream containing a set of programs or content to splitter 103 and further to tuner 104 and tuner 110. In another embodiment, the ODU control 132 receives inputs from controller 116 and also from link circuit 106 and link circuit 112 and provides DC voltage levels and a separate tuning control signal to ODU 101 using low frequency carrier based frequency shift keying modulation. Controller 116 also may send control commands to disable ODU controller 130 from providing either direct current (DC) voltages or control signals to ODU 101.

It should be appreciated by one skilled in the art that the blocks described inside set top box 102 have important interrelations, and some blocks may be combined and/or rearranged and still provide the same basic overall functionality. For example, transport decoder 108 and transport decoder 114 may be combined and further integrated along with some or all of the functions of controller 116 into an SoC that operates as the main controller for set top box 102. Further, control of various functions may be distributed or allocated based on specific design applications and requirements. As an example, the processing paths for the two input signal streams may operate for specific types of signals. Tuner 104, link circuit 106, and transport decoder 108 may receive, demodulate, and decode satellite signals containing content in high definition audio and video formats while tuner 110, link circuit 112, and transport decoder 114 may receive, demodulate, and decode signals containing data for maintaining the operation of a program guide.

Although set top box 102 is described above as receiving a single converted signal stream, set top box 102 may also be configured to receive two or more separate converted signal streams supplied by ODU 101 in some modes of operation. Operation in these modes may include additional components including switches and/or further tuning and signal receiving components, not shown.

Figure 2:
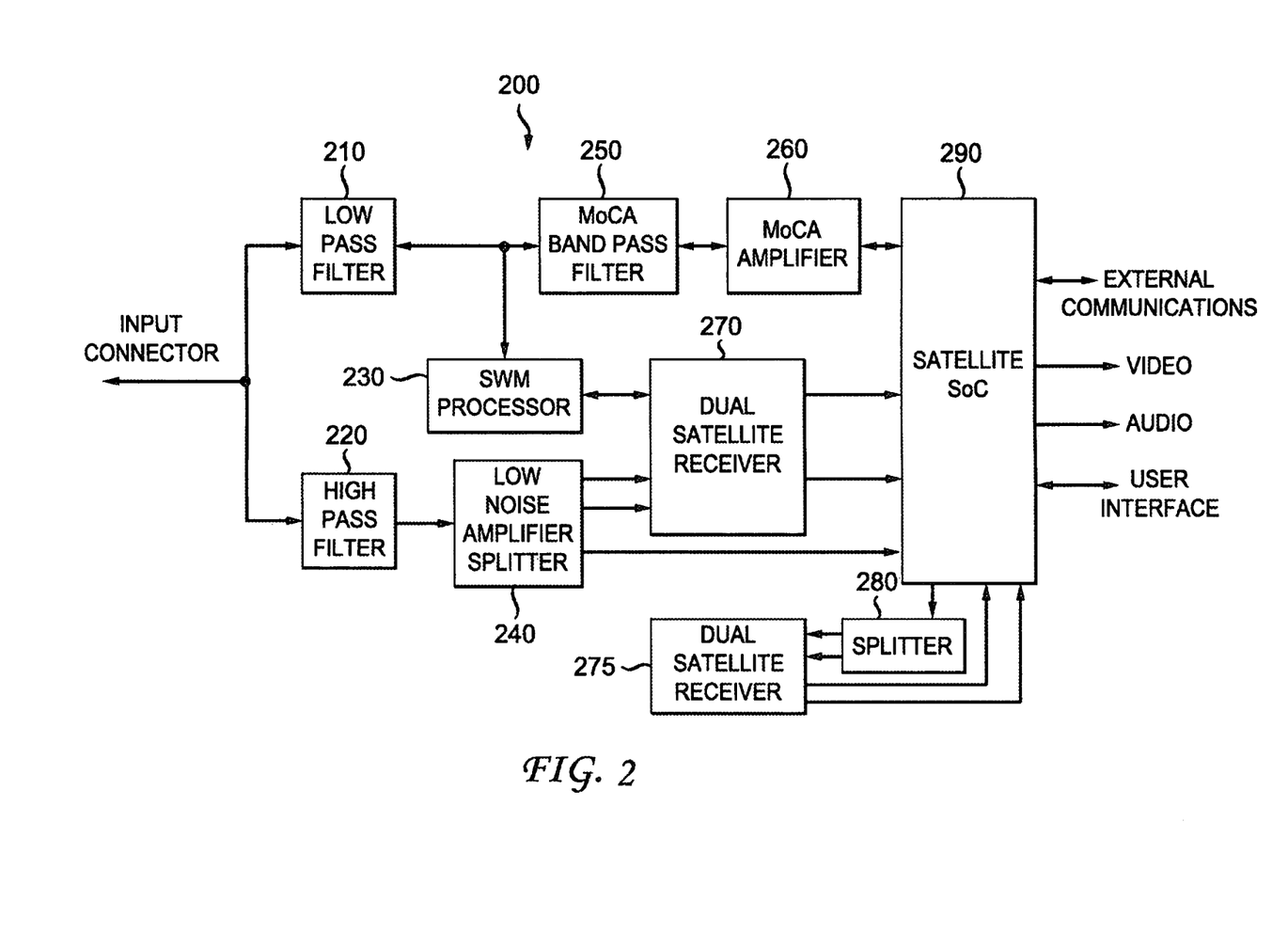
FIG. 2 is a block diagram of another exemplary device for receiving and processing signals in accordance with the present disclosure.

Turning now to FIG. 2, a block diagram of another exemplary embodiment of a signal receiving device including the ability to tune and receive six programs or channels of content is shown. Signal receiving device 200 operates in a manner similar to signal receiving device 100 described above in FIG. 1 and primarily receives signals provided by a service provider over a satellite communications network. Signal receiving device 200 further include the ability to operate in a home network using the Multimedia over Cable Alliance (MoCA) interface. The MoCA interface allows separate audio and video signals to be communicated to additional signal receiving devices in a home network using the same wiring (e.g., co-axial cable) used for receiving a broadcast signal (e.g., the satellite signal described herein). Further, signal receiving device 200 includes an interface for multiple satellite dishes or block converters through a single wire multi-switch (SWM) interface and controller. Additionally, signal receiving device 200 includes an SoC that incorporates many of the functions and features implemented in signal receiving device 200 and described in detail earlier for set-top box 102 in FIG. 1. Additional tuning functions and operations are implemented using additional tuner ICs.

The input signal is connected to a low pass filter 210 as well as a high pass filter 220. Low pass filter 210 connects to SWM processor 230. Low pass filter 210 also connects to MoCA band pass filter 250. MoCA band pass filter 250 connects to MoCA amplifier 260. MoCA amplifier 260 connects to satellite SoC 290. High pass filter 230 connects to low noise amplifier splitter 240. Low noise amplifier splitter 240 includes two connections to dual satellite receiver 270 and also connects to satellite SoC 290. Dual satellite receiver 275 includes two connections to satellite SoC 290 and also connects to SWM processor 230. Satellite SoC 290 connects to splitter 280. Splitter 280 includes two connections to dual satellite receiver 275. Dual satellite receiver includes two connections to satellite SoC 290. Satellite SoC 290 also connects to external interfaces for audio output, video output, user interface, and external communications.

It is important to note that, except as described below, functions and operations associated with dual satellite receiver 270, dual satellite receiver 275, and satellite SoC 290 are similar to those described above for tuner 104, link circuit 106, transport decoder 108, and controller 116 in FIG. 1 and their function and operation will not be described in further detail here. In addition, several components and interconnections necessary for complete operation of signal receiving device 200 are not shown in the interest of conciseness, as the components not shown are well known to those skilled in the art.

The satellite input signal (e.g., a converted signal described in FIG. 1) at the input of signal receiving device 200 is provided to both low pass filter 210 and high pass filter 220. The signal at the input of signal receiving device 200 may also be composed of other signal components including a bi-directional home networking signal provided over a MoCA network. The signal at the input may also include a bidirectional SWM control signal. Each of these signal components operate in separate frequency ranges allowing them to coexist on the same co-axial cable without directly interfering with each other.

The frequency response properties of low pass filter 210 and high pass filter 220 are such that the frequency pass bands of each do not overlap. The arrangement, often referred to as a diplexer, allows for a separation, through signal filtering, of the incoming satellite signal from the MoCA signal and SWM control signal. In a preferred embodiment, the low pass filter frequency response pass band ends at a frequency below 900 MHz. Low pass filter permits a SWM control signal in a frequency range around 2.3 MHz and a MoCA signal in a frequency range from 475

MHz to 625 MHz to pass through to subsequent blocks while attenuating, or not passing through, a satellite signal in a frequency range from 950 MHz to 2,150 MHz. High pass filter 220 operates in an opposite manner passing the satellite signal through and attenuating the SWM signal and MoCA signal.

MoCA band pass filter 250 provides additional filtering for the MoCA signal, including further attenuation of other signals, such as the SWM control signal and the satellite signal. In a preferred embodiment, MoCA band pass filter 250 has a pass band frequency response limited to a frequency range from 475 MHz to 625 MHz. MoCA amplifier 260 is amplifiers the MoCA signal both for reception and transmission. As described above the MoCA interface permits communications of audio and video signals in a home network and may operate bi-directionally. MoCA amplifier 260 includes a low noise amplifier for improving reception performance of a MoCA signal received by signal receiving device 200 from another network connected device. The received and amplified-signal from MoCA amplifier 260 is provided to satellite SoC 290. Satellite SoC 290 tunes, demodulates, and decodes the received MoCA signal and provides the signal to a number final destinations, including audio and video outputs as well as a mass storage device (e.g., hard disk drive, optical drive, and the like), not shown. Additionally, MoCA amplifier 260 includes a power amplifier for increasing the transmitted signal level of the MoCA signal sent by signal receiving device 200 to another network connected device. Satellite SoC 290 generates and formats the MoCA transmit signal using audio and video content available in signal receiving device, including content received from the input (e.g., satellite signal) and content from the mass storage device. Adjustment of the receive signal amplification as well as the transmit signal amplification in MoCA amplifier 260 may be controlled by satellite SoC 290.

The SWM processor 230 provides a communications interface to one or more outdoor satellite units (e.g., ODU 101 described in FIG. 1). SWM processor modulates a control signal onto a 2.3 MHz frequency carrier signal using frequency shift keying (FSK). SWM processor 230 provides the modulated control at the input of the signal receiving device 200 for transmission through the co-axial cable to the outdoor satellite unit(s). The control signal used to control the operation of the outdoor satellite units, include satellite signal selection and transponder selection. The control signal may by generated by dual satellite receiver 275 or alternately be generated by satellite SoC 290. SWM processor 230 may also receive and demodulate a 2.3 MHz FSK signal received from the outdoor satellite unit(s) and provide the demodulated signal to one or more blocks in signal receiving device 200 (e.g., dual satellite receiver 275 and/or satellite SoC 290).

The received input satellite signal passes through high pass filter 220 and is provided to low noise amplifier splitter 240. Low noise amplifier splitter 240 includes a configuration of several amplifiers that provide amplification of the received signal. In addition; the amplifiers are configured to provide several simultaneous signal outputs. In a preferred embodiment, low noise amplifier splitter 240 amplifies the incoming satellite signal by a factor 10 (i.e. 10 dB of signal power gain) and provides three simultaneous signals (i.e., amplified satellite signals) as output signals.

Two of the output signals from low noise amplifier splitter 240 are provided as separate input signals to dual satellite receiver 270. Dual satellite receiver 270 tunes and demodulates two separate satellite channels or programs from the input signal and provides each of these channels or programs as separate transport streams to satellite SoC 290. A third output signal from low noise amplifier splitter 240 is provided directly to satellite SoC 290. Satellite SoC 290 includes an internal input amplifier splitter, similar to low noise amplifier splitter 240, for processing and further splitting the input signal. SoC 290 also includes two additional tuner and demodulator blocks, similar in operation to dual satellite receiver 270, that produce two additional transport streams.

Satellite SoC 290 also provides an output signal from the internal input amplifier splitter to splitter 280. Splitter 280 splits, or divides, the input signal into two additional signals by splitting, or dividing, the signal power and provides these two signals to the input of dual satellite receiver 275. Dual satellite receiver 275 tunes and demodulates two separate satellite channels, similar to dual satellite receiver 270, and provides each of these channels as additional separate transports streams to satellite SoC 290. Control of the tuning and demodulation of all six tuning and demodulating circuits (i.e., two in satellite SoC 290 and two each in dual satellite receiver 270 and dual satellite receiver 275) is performed by SoC 290.

It is important to note that the signal at the input of signal receiving device 200 is received on a co-axial cable. A co-axial cable carries the signal as an unbalanced or single-ended signal referenced to the ground of the cable. However, in order to improve performance in a signal receiving device against reception and operational impairments, such as unintended radiated emissions and signal interference immunity, signals are often transmitted, provided, or interfaced as differential signals. Differential or balanced signals do not require a reference to a ground. In many cases, conversion of the input signal from an unbalanced single-ended signal to a balanced differential signal may be performed at the input the signal receiving device (e.g., signal receiving device 200). Further processing in the signal receiving device is performed using the balanced differential signals. As a result, many RF input and output signal interfaces or connections for circuit elements, such as dual satellite receiver 270, dual satellite receiver 275, and satellite SoC 290, require and use balanced differential signals.

In signal receiving device 200, the conversion from an unbalanced single-ended signal (i.e., input satellite signal) to a balanced differential signal may be performed by low noise amplifier splitter 240. The conversion at the low noise amplifier splitter 240 allows balanced differential signals to be provided to dual satellite receiver 270 and satellite SoC 290. However, the balanced differential signal from the output of satellite SoC 290 also must be provided to two inputs of satellite receiver 275. As a result, splitter 280 may operate as a balanced differential signal splitter. Splitter 280 receives a balanced differential signal from satellite SoC 290 while providing two balanced differential signals to dual satellite receiver 275. Additional aspects of the design of a splitter for performing a balanced differential splitting, such as splitter 280, will be described in further detail below.

Figure 3:
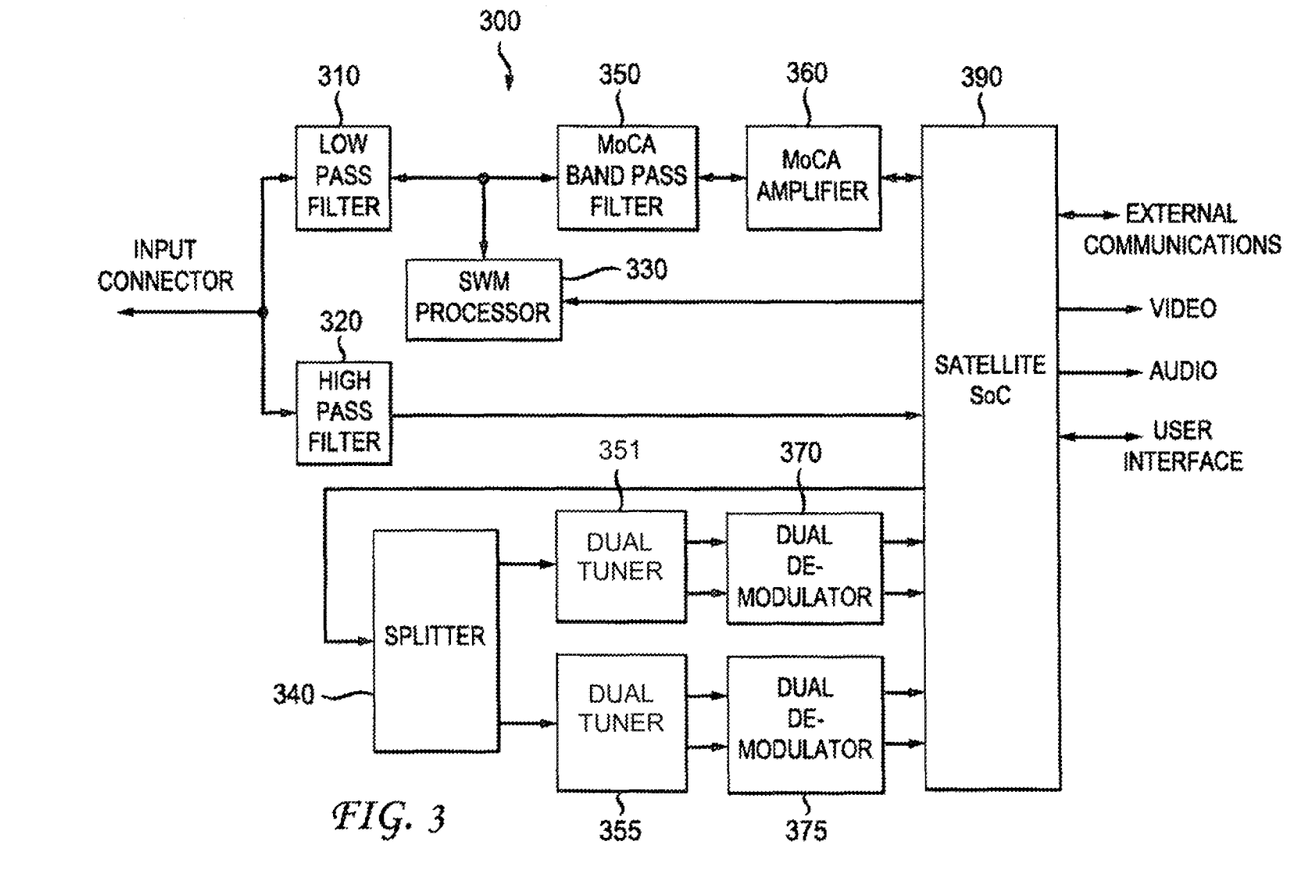
FIG. 3 is a block diagram of a further exemplary device for receiving and processing signals in accordance with the present disclosure.

Turning now to FIG. 3, a block diagram of a further exemplary embodiment of a signal receiving device 300 including the ability to tune and receive six programs of content is shown. Signal receiving device 300 operates in a manner similar to signal receiving device 200 described in FIG. 2. As in signal receiving device 200, signal receiving device 300 includes the ability to operate with a MoCA home network and includes a SWM interface and controller. Additionally, signal receiving device 300 includes an SoC that incorporates many of the functions and features used in signal receiving device 300 and described earlier for set top box 102 in FIG. 1. Additional tuning functions and operations are implemented using additional tuner and demodulator ICs.

The input signal is connected to a low pass filter 310 as well as a high pass filter 320. Low pass filter 310 connects to SWM processor 330. Low pass filter 310 also connects to MoCA band pass filter 350. MoCA band pass filter 350 connects to MoCA amplifier 360. MoCA amplifier 360 connects to satellite SoC 390. High pass filter 320 also connects satellite SoC 390. Satellite SoC 390 connects to splitter 340. Splitter 340 connects to dual tuner 351 as well as dual tuner 355. Dual tuner 351 includes two connections to dual demodulator 370. Dual demodulator 370 includes two connections to satellite SoC 390. Dual tuner 355 includes two connections to dual demodulator 375. Dual demodulator 375 also includes two connections to satellite SoC 390. Satellite SoC also connects to SWM processor 330. Satellite SoC 390 also connects to external interfaces for audio output, video output, user interface, and external communications.

The function and operations associated with low pass filter 310, high pass filter 320, MoCA bandpass filter 350, SWM processor 330, and MoCA amplifier 360 are similar to like numbered elements for signal receiving device 200 described in FIG. 2 and will not be described in further detail here. Further, except as described below, the function and operations of dual tuner 351, dual tuner 355, dual demodulator 370, and dual demodulator 375 are similar to dual satellite receiver 270 and dual satellite receiver 275 described in FIG. 2 and will not be described in further detail here. Also, except as described below, the function and operation of splitter 240 and satellite SoC 390 are similar to splitter 280 and satellite SoC 290 described in FIG. 2 and will not be described in further detail here. In addition, several components and interconnections necessary for complete operation of signal receiving device 300 are not shown in the interest of conciseness, as the components not shown are well known to those skilled in the art.

The received satellite input signal, as an unbalanced single-ended signal, is passed through high pass filter 320 to satellite SoC 390. Satellite SoC 390 includes an internal input signal amplifier and splitter. The internal amplifier and splitter also include the capability to convert the unbalanced single-ended signal from high pass filter 320 into a balanced differential signal. The internal amplifier and splitter further provides two output signals to the internal tuners and demodulators for receiving channels or program content from the input signal. The third output signal from the internal amplifier and splitter is provided as a balanced differential signal to signal splitter 340. Signal splitter 340 includes circuitry for splitting, or dividing the signal power in the received signal into two output signals. Dual tuner 351 and dual tuner 355 both utilize an interface for signals in a balanced differential signal format. As a result, signal splitter 340 provides signal splitting for a balanced differential input signal and produces two balanced differential output signals. Additional aspects of the design of a splitter for performing a balanced differential splitting, such as signal splitter 340, will be described in further detail below.

It is important to note that signal splitter circuits may be configured using one or more active components (e.g., amplifiers as described earlier). In some instances, additional active circuits may be cost and/or performance prohibitive. For instance, using active components in splitter 280 or signal splitter 340 described earlier may degrade reception performance for the input signal by increasing noise or distortion levels in the signal. The performance degradation may be particularly a problem when several signal splitting elements are used and connected in series to produce multiple output signals.

An unbalanced single-ended signal splitter circuit may also be implemented using passive components, such as resistors or other conductive elements. The unbalanced single-ended signal splitter circuit may further be implemented using electromagnetic coupling elements, (e.g., one or more transformers). Either configuration may be used to split the input signal power between the outputs and also maintain a proper impedance match and may offer a lower cost efficient design choice.

However, signal splitting using low cost passive components becomes more difficult when balanced differential signals are used. Two embodiments are described below that utilize low cost space efficient passive components and that may be used in configurations where additional active elements may be performance prohibitive. The embodiments may further take advantage of inherent performance conditions, such as excess signal gain, in complex receiving architectures (e.g., signal receiving device 200 and signal receiving device 300). However, the embodiments may be equally suited to simpler architectures (e.g., signal receiving device 100) that only require use of a signal splitter for power splitting an input signal into two output signals.

Figure 4:
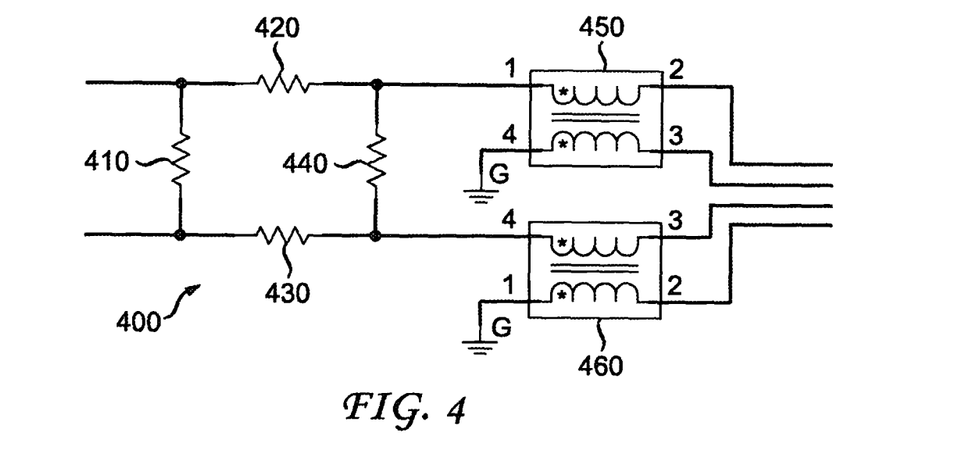
FIG. 4 is a block diagram of an exemplary signal splitter used in a signal receiving device in accordance with the present disclosure.

Turning to FIG. 4, a block diagram of a signal splitter 400 used in a signal receiving device in accordance with the present disclosure is shown. Signal splitter 400 has an input capable of receiving a balanced differential input signal and is capable of producing two balanced differential output signals. Signal splitter 400 may be used in operations requiring signal splitting on balanced differential signals, such as described for splitter 280 as part of signal receiving device 200 in FIG. 2 or splitter 340 as part of signal receiving device 300 in FIG. 3. Furthermore, with some additional circuitry, signal splitter 400 may be used as splitter 103 as part of signal receiving device 100 in FIG. 1.

A first component 410 in signal splitter 400 is connected between the two input lines for the balanced differential input. Component 420 and component 430 are connected to each end of component 410 and in series with each input line. Component 440 is connected between the other ends of each of component 420 and component 430. One input on each of transformer 450 and transformer 460 are connected to each end of component 440 and in series with the each input line. The other input on each of transformer 450 and transformer 460 is connected to a ground potential. The two outputs on each of transformer 450 and transformer 460 provide separate balanced differential outputs for signal splitter 400.

Components 410, 420, 430, and 440 form a passive attenuator network for a balanced differential signal. The attenuation level in the network may be selected based on several design considerations including desired attenuation and impedance matching at the input and to transformer 450 and transformer 460. In one embodiment, the attenuation and impedance values for the passive attenuator network are 6 dB, 18 ohms at the input, and 150 ohms at the output respectively. The values for the components are shown in Table 1.

TABLE 1

| COMPONENT | VALUE (ohms) |
|---|---|
| 410 | 150 |
| 420 | 18 |

TABLE 1-continued

| COMPONENT | VALUE (ohms) |
|---|---|
| 430 | 18 |
| 440 | 150 |

Although the above components are shown as resistive elements, the components may include other passive elements (e.g., capacitive elements and inductive elements). The use of conductive elements along with resistive elements permits further adjustment of performance aspects for signal splitter 400. Alternatively, R410 and/or R440 may be implemented as two separate shunt components (e.g., resistors) in series with the node connecting the two also connected to a ground reference. The use of the ground reference may improve certain performance aspects of signal splitter 400, such as noise immunity or isolation, without altering balanced differential signal processing capabilities.

Each of transformer 450 and transformer 460 operate in a similar manner by providing signal splitting on each of the signal lines output from the passive attenuator network described previously. One or both of transformers 450 and 460 may utilize a winding ratio transformer or may alternately utilize transmission line coupling mechanisms as are well known to those skilled in the art. The winding ratio or coupling mechanisms may be adjusted and matched to the desired impedance requirements (e.g., input and output impedance) for the passive attenuator arrangement and the outputs of splitter 400. In a preferred embodiment, transformer 450 and transformer 460 operate as a transmission line transformer with an equivalent one to one transformer winding ratio.

It is important to note that the combination of the balanced attenuator arrangement of components 410, 420, 430, and 440 and the transformers 450 and 460 result in a signal level insertion loss of between 10 dB and 12 dB between the input and either output. Further, isolation between each output may be dependent on the design of transformers 450 and 460. Changes in insertion loss levels and/or isolation levels may be achieved by changes to values in components 410, 420, 430, and/or 440.

Figure 5:
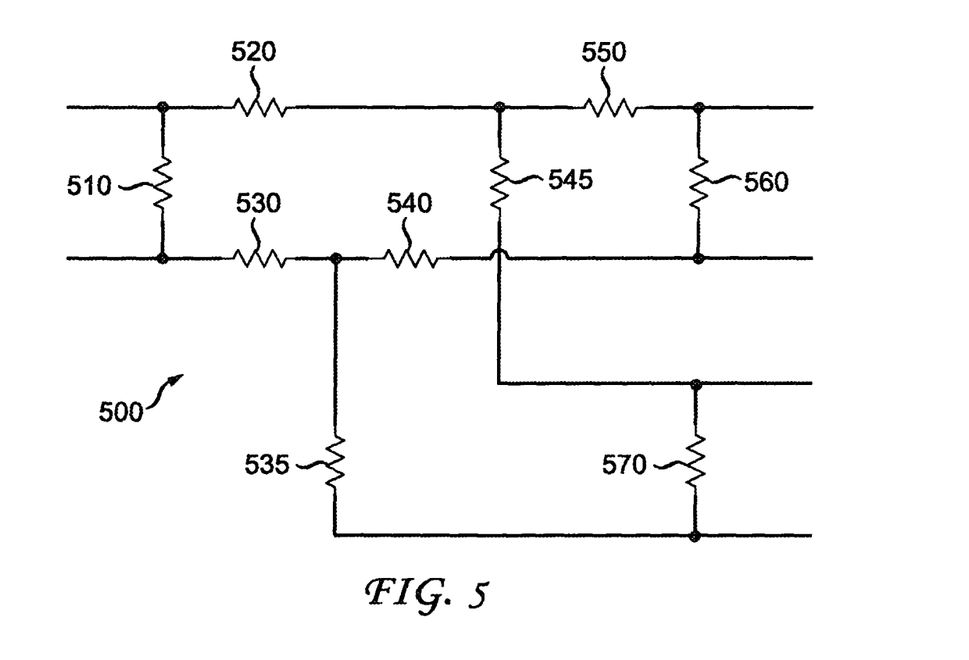
FIG. 5 is a block diagram of another exemplary signal splitter used in a signal receiving device in accordance with the present disclosure.

Turning to FIG. 5, a block diagram of a signal splitter 500 used in a signal receiving device in accordance with the present disclosure is shown. As with signal splitter 400, signal splitter 500 has an input capable of receiving a balanced differential input signal and is capable of producing two balanced differential output signals. Similar to signal splitter 400, signal splitter 500 may be used in operations requiring signal splitting for balanced differential signals, such as described for splitter 280 as part of signal receiving device 200 in FIG. 2 or splitter 340 as part of signal receiving device 300 in FIG. 3. Furthermore, with some additional circuitry, signal splitter 500 may be used as splitter 103 as part of signal receiving device 100 in FIG. 1.

Component 510 in signal splitter 500 is connected between the two input lines for the balanced differential input. Component 520 and component 530 are connected to each end on component 510 and in series with each input line. One end from each of Component 550 and 540 are additionally connected in series to the other ends on component 520 and component 530 respectively. Component 560 is connected between the other ends on each of component 550 and component 540 and serves as the first balanced differential output for signal splitter 500. One end on each of component 545 and component 535 is connected to the node connecting components 520 and 550 and the node connecting components 530 and 540 respectively. Component 570 is connected between the other ends on each of component 545 and component 535 and serves as the second balanced differential output for signal splitter 500.

The arrangement of elements described for signal splitter 500 represent a modified resistive attenuator network that includes three separate portions joined at a tap point, identified as the connection node between elements 520, 545, and 550 and the connection node between elements 530, 535, and 540. The arrangement in signal splitter 500 eliminates the need for, and use of, electromagnetic coupling elements, such as transformers. As a result, signal splitter 500 provides both signal level attenuation and isolation between the input and outputs as well more controlled signal balance for the differential signal outputs. In a preferred embodiment signal splitter 500 uses only resistive elements and provides 12 dB signal attenuation, or insertion loss, from the input to either output port. The signal splitter 500 also provides 10 dB of signal isolation between the outputs. Table 2 shows an exemplary set of element values.

TABLE 2

| ELEMENT | VALUE (ohms) |
|---|---|
| 510 | 470 |
| 520 | 82 |
| 530 | 82 |
| 535 | 60 |
| 540 | 60 |
| 545 | 60 |
| 550 | 60 |
| 560 | 870 |
| 570 | 870 |

Although the above elements are shown as resistive elements, the elements may include other elements (e.g., capacitive elements and inductive elements). The use of conductive elements along with resistive elements permits further adjustment of performance aspects for signal splitter 500. Alternatively, elements 510, 560, and/or 570 may be implemented as two separate shunt elements (e.g., resistors) in series with the node connecting the two also connected to a ground reference. The use of the ground reference may improve certain performance aspects of signal splitter 500, such as noise immunity or isolation, without altering balanced differential signal processing capabilities.

Further, signal splitter 500 may provide additional design flexibility for simultaneously adjusting performance parameters (e.g. attenuation, isolation, impedance). In some embodiments, higher isolation between the outputs may be required to reduce undesired signal leakage, or egress/ingress, issues from a circuit connected to the first output of signal splitter 500 to another circuit connected to the second output. Improvement in isolation may also be achieved by increasing the effective signal attenuation level in one or both sets of branch elements in signal splitter 500 (i.e., elements 535, 545, and 570 and elements 550, 540, and 560). Further, in some embodiments, different signal attenuation levels may be desirable for each of the output signals. The attenuation level of one set of branch elements (e.g., elements 535, 545, and 570) may be adjusted with respect to the attenuation level of the other set of branch elements (e.g., elements 550, 540, and 560). The attenuation level may be adjusted by changing the values for the set of elements in one of the branches.

In another embodiment, the first portion of signal splitter 500 (e.g., elements 510, 520, and 530) may provide signal attenuation that is common to the signals produced at both outputs of signal splitter 500. In contrast, the second portion (e.g., elements 550, 540, and 560) will typically only provide signal attenuation for the output signal produced at the terminals across element 560 while the third portion (e.g., elements 535, 545, and 570) will typically only provide signal attenuation for the output signal produced at the terminals across element 570. As a result, a partitioning of attenuation may be done by allocating some or all of the desired signal attenuation, between the input and one or the other output to either the first portion, second portion, or third portion of signal splitter 500 through the adjustment of the element values in each portion.

Figure 6:
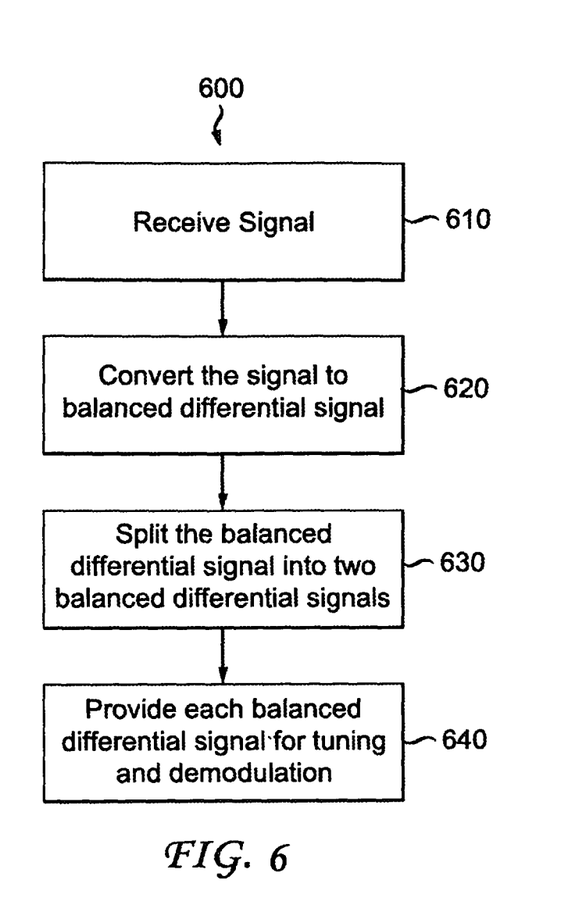
FIG. 6 is a flowchart of an exemplary process for receiving a signal and splitting a signal into two signals in accordance with the present disclosure.

Turning now to FIG. 6, a flowchart describing a process 600 for receiving a signal and splitting the signal into two signals in accordance with the present disclosure is shown. Process 600 will primarily be described with respect to signal receiving device 300 described in FIG. 3. The steps of process may equally apply to the signal receiving device 200 in FIG. 2. Additionally, one or more of the steps in process 600 may be equally applicable to signal receiving device 100 in FIG. 1. Further, it is important to note that some of the steps described in process 600 may be implemented more than once, or may be implemented recursively. Such modifications may be made without any effect to the overall aspects of process 600.

At step 610, a signal, such as a signal provided over a satellite broadcast network from a service provider, is received. In some embodiments, the received signal may be an unbalanced single-ended input signal to the signal receiving device. The unbalanced single-ended input signal may be provided as an RF signal through a co-axial cable. In other embodiments, the received signal may be an unbalanced single-ended input signal from one or more processing components within a signal receiving device. In a preferred embodiment, the signal is received in satellite SoC 390 after passing through high pass filter 320 from the input of signal receiving device 300.

At step 620, the signal is converted from an unbalanced single-ended signal to a balanced differential signal. In some embodiments, the conversion, at step 620, may be done in a separate component (e.g., a transformer). In other embodiments, the conversion may be done in conjunction with other processing. In a preferred embodiment, the conversion is done in satellite SoC 390 as part of the input signal amplification and initial input signal splitting processing.

At step 630, the balanced differential signal is split into two balanced differential signals, each provided as outputs in parallel. The signal splitting, at step 630, is performed using passive circuit elements. In some embodiments, the signal splitting may be done using resistive components as described for signal splitter 500 in FIG. 5. The use of resistive components for the differential signal splitting, at step 630, provides a low cost solution that does not use electromagnetic coupling components (e.g. transformers). The splitting, at step 630, may also be done using a combination of resistive or conductive components and may include a reduced number of electromagnetic components (e.g. transformers) as described for signal splitter 400 in FIG. 4. It is important to note the differential signal splitting, at step 630, is performed on the received signal across the entire input signal frequency range (e.g., 950 MHz, to 2,150 MHz).

Last, at step 640, each of the balanced differential output signals generated by the differential splitting, at step 630, are provided to other processing functions. These functions may include, but are not limited to, tuning, demodulation, and decoding as part of receiving a channel or program in the input signal. In a preferred embodiment, one of the differential output signals is provided to dual tuner 351. The other differential output signal is provided to dual tuner 355.

It is important to note that the steps in process 600 describe only a preferred embodiment. In some other embodiments, certain steps in process 600 may be rearranged or may be eliminated. For example, in one embodiment, the converting, at step 620, may not be used because the received input signal is a balanced differential signal. In another embodiment, the signal splitting, at step 630, may include converting one of the balanced differential output signals to a single ended, unbalanced output signal before providing this signal, at step 640, for further processing.

The above described embodiments relate to an apparatus and method for splitting an RF signal and providing the signal to a plurality of tuners in a receiver. The apparatus and method address issues related to interfacing and signal splitting differential signals using simple low cost circuits. In one embodiment resistive and conductive passive elements are used to reduce the number of electromagnetic coupling elements in the signal splitter. In a second embodiment a circuit configuration utilizing resistive elements arranged in a resistive attenuator network with a tap point eliminates the need for electromagnetic coupling elements. The second embodiment further provides for a specified signal attenuation level along with the flexibility to adjust other performance parameters (isolation, impedance) based on design requirements.

Although embodiments which incorporate the teachings of the present disclosure have been shown and described in detail herein, those skilled in the art can readily devise many other varied embodiments that still incorporate these teachings. Having described preferred embodiments for a method and apparatus for processing a radio frequency signal (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

The invention claimed is:

1. An apparatus for dividing signal power comprising:
   a first circuit coupled to an input, the first circuit operating as a first portion of a signal attenuator for an input signal;
   a second circuit coupled to the output of the first circuit, the second circuit operating as a second portion of the signal attenuator for the input signal and outputting a first differential output signal; and
   a third circuit coupled to the output of the first circuit, the third circuit also operating as the second portion of the signal attenuator for the input signal and outputting a second differential output signal,
   wherein the first circuit comprises two series elements and one shunt element, the second circuit comprises two series elements and one shunt element, and the third circuit comprises two series elements and one shunt element.

2. The apparatus of claim 1, wherein the apparatus reduces the signal level of at least one of the first differential output signal and the second differential output signal with respect to the input signal.

3. The apparatus of claim 1, wherein the apparatus reduces the signal level of both of the first differential output signal and the second differential output signal with respect to the input signal and wherein the signal level of the first differential output signal is reduced more than the signal level of the second differential output signal.

4. The apparatus of claim 1, wherein the input signal is a differential signal.

5. The apparatus of claim 1 wherein the first circuit, second circuit, and third circuit include only resistive elements.

6. The apparatus of claim 1, wherein the apparatus is used in a receiving device that is capable of simultaneously selecting more than two programs of content from the input signal.

7. The apparatus of claim 6, wherein the content is at least one of audio content and video content provided by a service provider.

8. The apparatus of claim 1, wherein the apparatus operates on the input signal in the frequency range between 950 Megahertz and 2,150 Megahertz.

9. A method for processing a signal comprising:
receiving a signal;
splitting the received signal to produce a first output signal and a second output signal, the splitting being performed using a differential signal format, the splitting further being performed using only at least one of resistive elements, capacitive elements, and inductive elements; and
outputting the first output signal in a differential signal format to a first circuit and the second output signal in a differential signal format to a second circuit,
wherein the at least one of the resistive elements, capacitive elements and inductive elements comprises two series elements and one shunt element.

10. The method of claim 9, further comprising converting the received signal from an unbalanced signal to a differential signal before performing the splitting.

11. The method of claim 9, wherein the splitting is performed using circuitry containing only resistive elements.

12. The method of claim 9, wherein the splitting includes reducing the signal level of at least one of the first output signal and the second output signal with respect to the received signal.

13. The method of claim 9, wherein the splitting includes reducing the signal level of both of the first output signal and the second output signal with respect to the received signal and wherein the signal level of the first output signal is reduced more than the signal level of the second output signal.

14. The method of claim 9, wherein the method is used in a receiving device that is capable of simultaneously selecting more than two programs of content from the received signal.

15. The method of claim 14, wherein the content is at least one of audio content and video content provided by a service provider.

16. The method of claim 9, wherein the splitting is performed over a frequency range of 950 Megahertz and 2,150 Megahertz.

17. An apparatus for processing a signal comprising:
means for receiving a signal, the received signal being in a differential signal format;
means for splitting the received signal to produce a first output signal and a second output signal, the means for splitting further being performed using only at least one of resistive elements, capacitive elements, and inductive elements; and
means for outputting the first output signal in a differential signal format to a first circuit and the second output signal in a differential signal format to a second circuit,
wherein the means for splitting comprises two series elements and one shunt element.

18. The apparatus of claim 17, wherein the received signal is an unbalanced signal and the apparatus further comprises means for converting the received signal from an unbalanced signal to a differential signal.

19. The apparatus of claim 17, wherein the means for splitting includes circuitry containing only resistive elements.

20. The apparatus of claim 17, wherein the means for splitting includes means for reducing the signal level of at least one of the first output signal and the second output signal with respect to the received signal.

21. The apparatus of claim 17, wherein the means for splitting includes means for reducing the signal level of both of the first output signal and the second output signal with respect to the received signal and wherein the signal level of the first output signal is reduced more than the signal level of the second output signal.

22. The apparatus of claim 17, wherein the apparatus is a receiving device that is capable of simultaneously selecting more than two programs of content from the received signal.

23. The apparatus of claim 22, wherein the content is at least one of audio content and video content provided by a service provider.

24. The apparatus of claim 17, wherein the means for splitting operates on the received signal in a frequency range of 950 Megahertz and 2,150 Megahertz.

25. The apparatus of claim 1, wherein the first circuit, second circuit, and third circuit include only at least one of resistive elements, capacitive elements and inductive elements.

* * * * *